United States Patent
Manzoor et al.

(10) Patent No.: US 9,121,471 B2
(45) Date of Patent: Sep. 1, 2015

(54) TORSIONAL VIBRATION DAMPER WITH NONUNIFORM ELASTOMER PROFILE

(75) Inventors: Suhale Manzoor, Plymouth, MI (US); Bruce G. Christenson, Canton, MI (US); Doug Averill, Holly, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 0 days.

(21) Appl. No.: 13/463,392

(22) Filed: May 3, 2012

(65) Prior Publication Data
US 2013/0291677 A1  Nov. 7, 2013

(51) Int. Cl.
| F16F 15/12 | (2006.01) |
| F16F 15/14 | (2006.01) |
| F16H 55/36 | (2006.01) |

(52) U.S. Cl.
CPC ....... *F16F 15/1442* (2013.01); *F16H 2055/366* (2013.01); *Y10T 74/2131* (2015.01)

(58) Field of Classification Search
CPC ..... F16F 15/14; F16F 15/1442; F16F 15/126; F16F 2055/366; F16F 55/36; Y10T 74/2131; Y10T 74/2127; Y10T 4/213
USPC .............................................. 74/574.4, 572.1
See application file for complete search history.

(56) References Cited

U.S. PATENT DOCUMENTS

| 2,439,269 | A | * | 4/1948 | Shafer ........................... 384/536 |
| 2,779,211 | A | | 1/1957 | Henrick |
| 2,861,472 | A | * | 11/1958 | Hansz .......................... 74/574.4 |
| 2,948,129 | A | | 8/1960 | Troyer |
| 2,972,904 | A | * | 2/1961 | Troyer .......................... 74/574.4 |
| 3,945,269 | A | * | 3/1976 | Bremer, Jr. ................... 74/574.4 |
| 4,083,265 | A | | 4/1978 | Bremer, Jr. |
| 4,318,309 | A | | 3/1982 | Bremer, Jr. |
| 4,395,809 | A | | 8/1983 | Whiteley |
| 5,025,681 | A | | 6/1991 | Andra |
| 5,231,893 | A | | 8/1993 | Sisco et al. |
| 5,453,056 | A | | 9/1995 | Ullrich et al. |
| 5,868,503 | A | * | 2/1999 | Bade ............................ 384/536 |
| 6,386,065 | B1 | | 5/2002 | Hodjat |

(Continued)

FOREIGN PATENT DOCUMENTS

| DE | 4397386 | | 5/1996 | |
| FR | 1212234 | * | 3/1960 | .......... F16F 15/1442 |

(Continued)

OTHER PUBLICATIONS

Machine translation of JP 2009008237.*

(Continued)

*Primary Examiner* — Richard WL Ridley
*Assistant Examiner* — Yamilka Pinero Medina
(74) *Attorney, Agent, or Firm* — Thompson Hine LLP

(57) ABSTRACT

A Torsional Vibration Damper includes a hub, a ring, and a rubber member that is compression fitted between the outer surface of the hub and the inner surface of the ring. The cross-sectional profile of the outer surface of the hub and the inner surface of the ring after the assembly of the TVD consists of two concave or convex arcs with their radii such that the cross-sectional profile's gap increases from the center to the sides. This variation of the cross-sectional profile's gap reduces the principal-strain buildup in the rubber, thereby improving the life of the Torsional Vibration Damper. This design also facilitates proper assembly as the components are self aligning.

8 Claims, 3 Drawing Sheets

(56) References Cited

U.S. PATENT DOCUMENTS

| | | | |
|---|---|---|---|
| 6,684,735 B2* | 2/2004 | Watanabe et al. | 74/574.4 |
| 7,171,750 B2* | 2/2007 | Kano | 29/896.93 |
| 7,354,637 B2* | 4/2008 | Tagawa et al. | 428/64.1 |
| 7,658,127 B2 | 2/2010 | Crist | |
| 2002/0157501 A1* | 10/2002 | Johnson et al. | 74/574 |
| 2006/0030441 A1 | 2/2006 | Watanabe et al. | |
| 2006/0272446 A1* | 12/2006 | Cortright et al. | 74/574.4 |
| 2007/0249442 A1* | 10/2007 | Grunau et al. | 474/94 |
| 2008/0034918 A1* | 2/2008 | Manzoor et al. | 74/574.4 |
| 2008/0047392 A1* | 2/2008 | Ciaccio | 74/574.4 |

FOREIGN PATENT DOCUMENTS

| | | | | |
|---|---|---|---|---|
| JP | 2004-053007 | 2/2004 | | |
| JP | 2009008237 | * 1/2009 | | F16H 55/36 |
| WO | 94/27061 | 11/1994 | | |

OTHER PUBLICATIONS

R.C. Hibbeler, *Mechanics of Materials*, 2.ed, Macmillan College Publishing Co. 1994, p. 34.

International Search Report and Written Opinion, International Application No. PCT/US2013/039220 (Jul. 15, 2013).

Partial computer generated translation of Holset (FR 1212234), p. 2, col. 1, line 24 through col. 2, line 25.

* cited by examiner

TORSIONAL VIBRATION DAMPER WITH NONUNIFORM ELASTOMER PROFILE

Torsional Vibration Dampers (TVDs) are employed extensively in powertrains and drivetrains driven by Internal Combustion ("IC") to reduce torsional vibrations that are transferred to rotating components due to the workings of an IC engine. When the natural frequency of these systems' torsional vibrations matches the natural frequency of the rotating components, the resultant vibrations gain considerable amplitude (a phenomenon known as resonance). If unabated, these vibrations can potentially damage accessories attached to the rotating component. Furthermore, such vibrations could also induce fatigue failure of the rotating component.

A TVD reduces torsional vibration of the rotating component in two ways. First, through absorption, the TVD breaks the vibratory amplitude peak into two separate (relatively smaller) peaks. Second, through damping, the TVD converts some of the kinetic energy present in the system into heat and dissipates it to the atmosphere. As a result, the rotating component can be optimized for weight, and the accessories attached to the rotating component experience relatively lower vibration.

The simplest TVD has three components, a structural bracket ("hub") that rigidly connects the TVD to the rotating component, an active inertial member ("ring"), and an elastomer member ("rubber") that provides the spring-dashpot system for the TVD. The hub and the ring are manufactured individually before the rubber is forced into the gap that exists between the hub and the ring (profile). The rubber is compressed and exerts a pressure between the metallic surfaces of the ring and hub, holding the assembly in place. The resultant assembly is known as an Insertion Style TVD, due to the process employed in its construction.

During operation of the TVD, the ring moves angularly in a to and fro motion relative to the hub, and in doing so imparts a shear-strain to the rubber. The frequency of this shear-strain provides the required absorption, and the magnitude of this shear-strain provides the required damping.

The radial cross-section of the rubber is defined by the profile which is the area between the outer surface of the hub and the inner surface of the ring. Some TVDs have an inward or outward hump in their profiles. Other more complex profile geometries such as wavy configurations have also been employed. When the rubber is assembled in this profile, its compression causes a principal-strain to develop that is detrimental to the fatigue life of the TVD. It has been generally assumed that a profile with a linear configuration minimizes principal-strain in the rubber.

In all of these embodiments, the distance between the outer surface of the hub and the inner surface of the ring remains constant throughout the entire cross-section. In other words, the outer surface of the hub and inner surface of the ring are parallel to each other.

SUMMARY OF THE INVENTION

The present invention is premised upon the realization that the principal-strain buildup in the rubber can be reduced by varying the distance between the outer surface of the hub and the inner surface of the ring. Both of these surfaces will have a concave or a convex configuration of varying degree with respect to each other, meaning that the radius of the two surfaces will not be identical. Consequently, the hub outer surface will not be parallel to the ring inner surface.

Where the surfaces are concave, the radius of the arc which defines the outer surface of the hub will be smaller than the radius of the arc which defines the inner surface of the ring. Similarly, where the surfaces are convex, the radius of the arc which defines the outer surface of the hub will be larger than the radius of the arc which defines the inner surface of the ring. Thus, the cross-section of the profile is not constant, but varies proportionately with its distance from the center of the profile.

This reduces the principal-strain buildup in the rubber, and facilitates the process of insertion due to a lower pressure resisting the flow of the rubber, and improves the fatigue life of the damper. The slight increase in the volume of the rubber is also a positive improvement, as the power dissipation capacity of the rubber (another measure of a TVD's fatigue life) is directly proportional to the volume of rubber present in a damper. Furthermore, this design is self-centering because of the sphere-within-a-sphere configuration of the hub outer surface and the ring inner surface.

The objects and advantages of the invention will be further appreciated in light of the following detailed description and drawings in which:

DETAILED DESCRIPTION OF THE DRAWINGS

Figure 1:
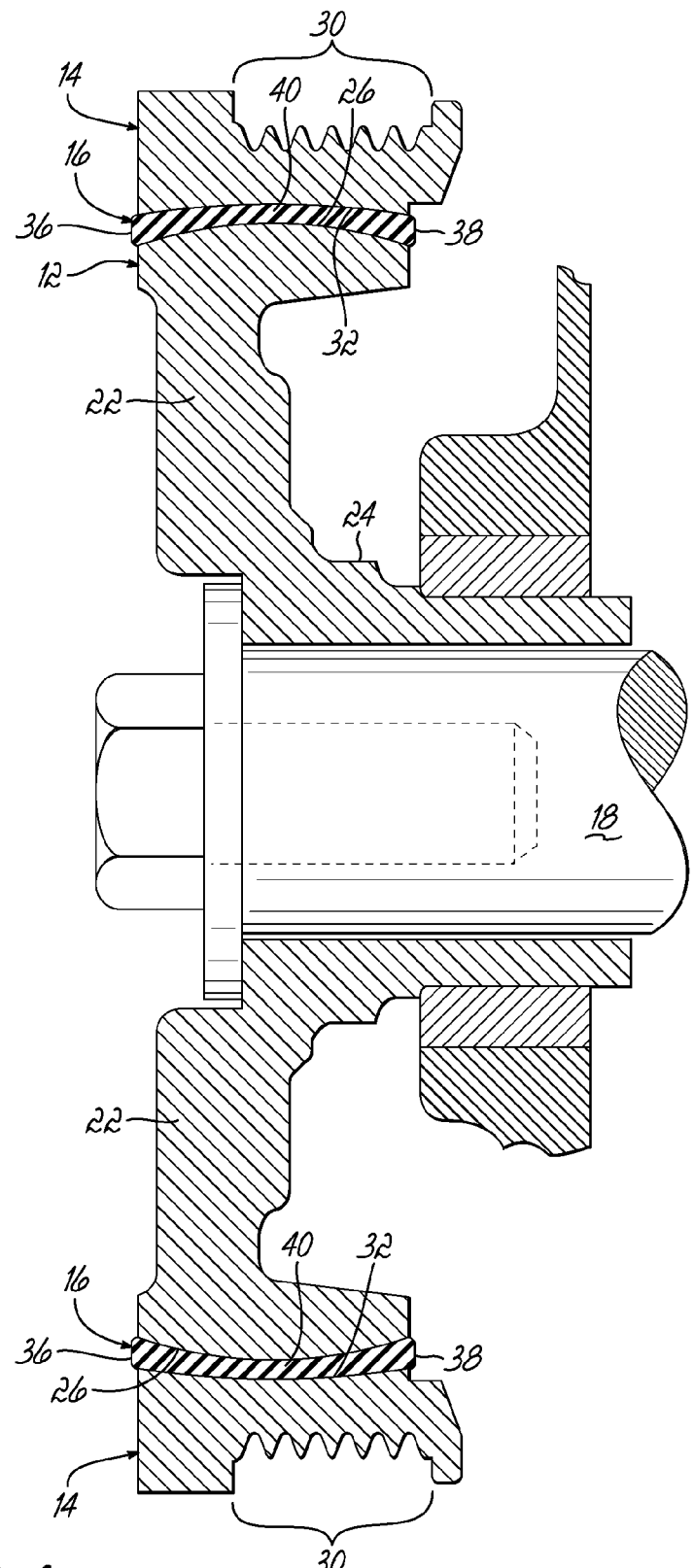
FIG. 1 is a cross-sectional view of a vibration damper made according to the present invention.

As shown in FIG. 1, the present invention is a torsional vibration damper (TVD) 10. FIG. 1 shows a relatively generic design of a TVD. Although there are many different design variations, all TVDs 10 of the present invention will include a structural bracket (hub) 12, an active inertial member (ring) 14, and an elastomeric member (rubber) 16. As shown, the hub 12 is attached to a rotating component of the system, typically an internal combustion engine. The hub 12 includes spokes 22 or alternately a web extending between the central portion 24 of the hub 12 and the outer peripheral surface 26.

The ring 14 as shown includes a recessed belt guide 30, which is designed to drive the serpentine belt, which in turn drives various accessories, such as the water pump and alternator. The ring 14 further includes an inner annular surface 32 which is opposite the outer peripheral surface 26 of the hub 12. The rubber 16 resides in the gap (profile) between the outer peripheral surface 26 and the inner annular surface 32. The profile will generally be about 3 mm to 10 mm in radial thickness and about 10 mm to 100 mm in axial width. The profile includes outer side portions 36 and 38 and central portion 40. The rubber 16 may be a strip or a ring. The rubber 16 can be formed from any typical elastomeric member used in a vibration absorber, such as butyl rubber or the like. The thickness of the rubber prior to insertion will be about 120% to 150% of the central thickness of the profile.

Figure 2:
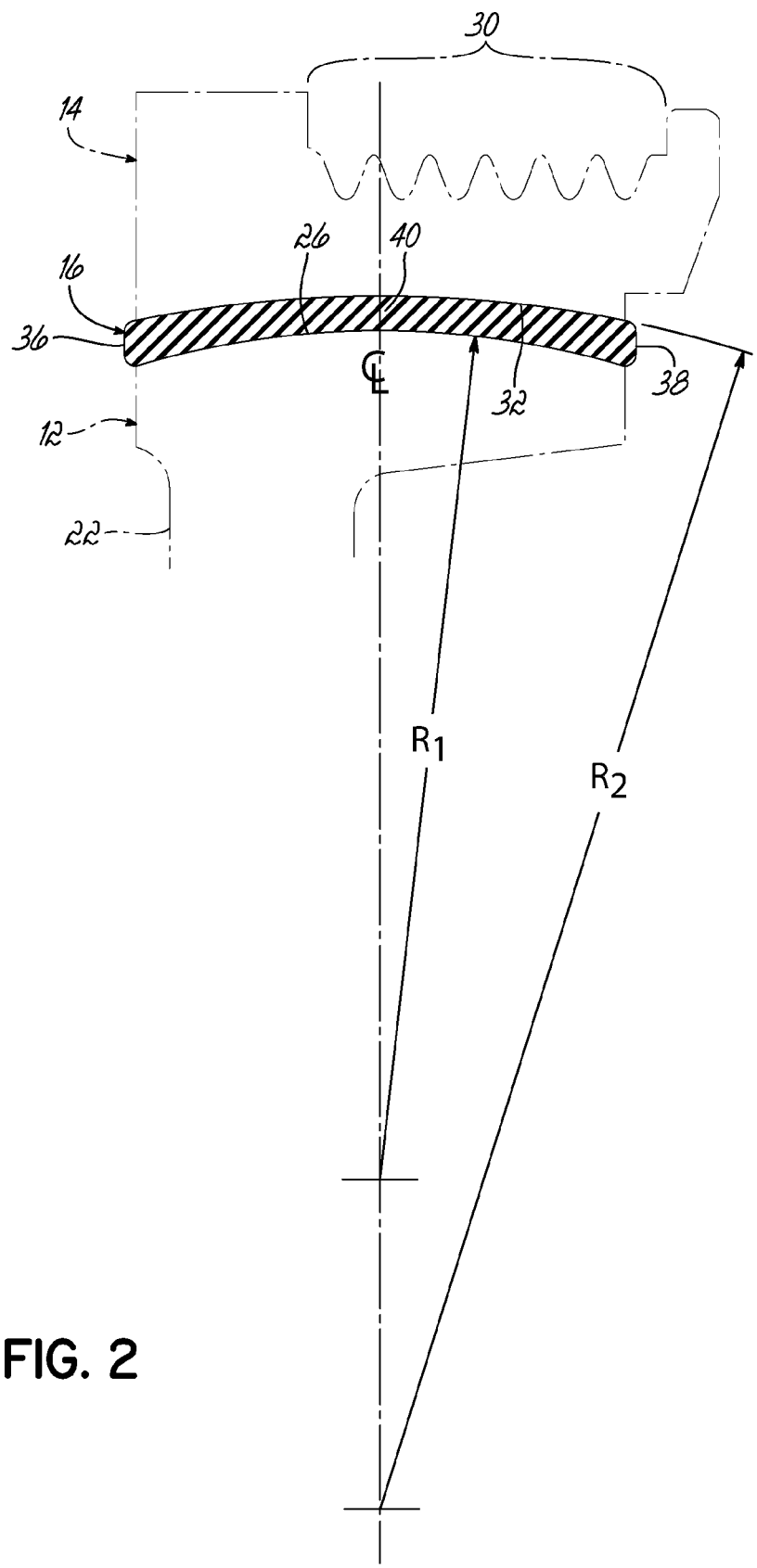
FIG. 2 is a diagrammatic enlarged cross-sectional depiction of the current invention with a concave profile.

As shown in FIG. 2, both the outer peripheral surface of the hub and inner annular surface of the ring 14 are concave arcs. Each of the arcs has a radius $R_1$ and $R_2$ as shown. The radius $R_1$ is less than the radius $R_2$, so the arc formed on the outer peripheral surface 26 has a larger radius than the arc which is formed on the inner annular surface 32 of the ring 14. Thus, the distance between the surfaces 26 and 32 varies across the cross-section. The profile thickness at side portions 36 and 38 is wider than the profile at the central portion 40. Again, typically the profile thickness at side portions will be 2 mm to 11 mm and the gap at the central portion will be 3 mm to 10 mm.

Figure 3:
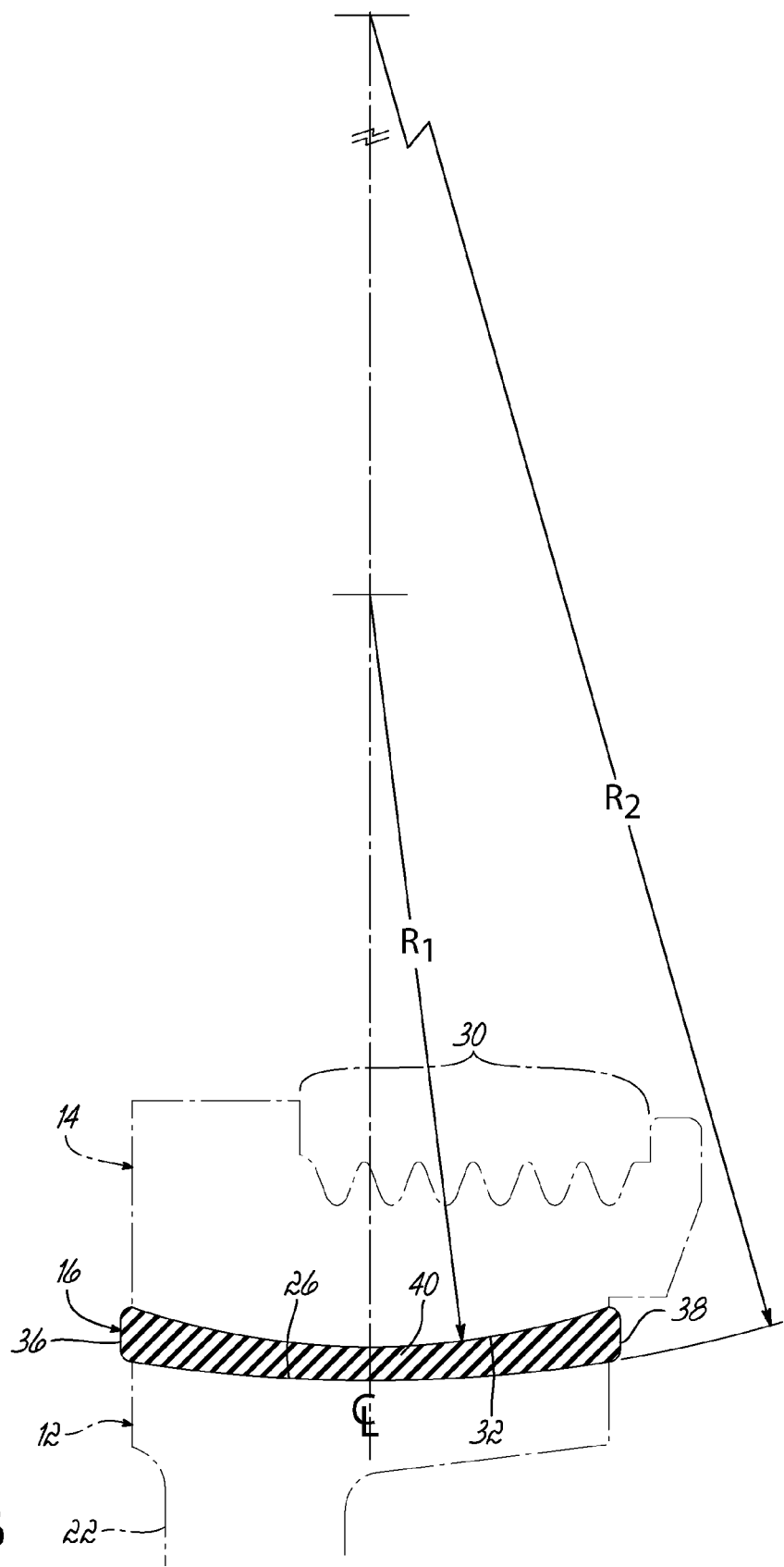
FIG. 3 is a view similar to FIG. 2 with a convex profile.

As shown in FIG. 3, both the outer peripheral surface of the hub and inner annular surface of the ring 14 are convex arcs. Each of the arcs has a radius $R_1$ and $R_2$ as shown. The radius $R_1$ is greater than the radius $R_2$, so the arc formed on the outer peripheral surface 26 has a larger radius than the arc which is formed on the inner annular surface 32 of the ring 14. Thus, the distance between the surfaces 26 and 32 varies across the cross-section. The profile thickness at side portions 36 and 38 is wider than the profile at the central portion 40. Again, typically the profile thickness at side portions will be 2 mm to 11 mm and the gap at the central portion will be 3 mm to 10 mm To assemble the TVD of the present invention, the ring 14 and the hub 12 are placed in a fixture, and a guide is used to force the elastomeric member 16 in the gap between the two. Generally, elastomeric member 16 will have a uniform cross-section so that, once inserted, the central portion of the profile 40 will be under greater compression than the sides of the profile 36 and 38. This compression holds the damper together without the need for adhesives. The actual dimensions of the rubber, as well as its composition, can be varied depending upon the design characteristics of the TVD.

This structure has many different advantages. In particular, it reduces localized principal-strain buildup in the rubber, which increases the effective life of the TVD. This design also reduces the manufacturing assembly scrap caused by rubber high-low rejections. Also, because both surfaces 32 and 26 are curved the assembly self centers.

This has been a description of the invention, along with the preferred method for practicing the invention, however, the invention itself should only be defined by the appended claims, wherein

We claim:

1. A torsional vibration damper comprising
   a hub adapted to attach to a rotating component, said hub having an outer peripheral surface;
   a ring surrounding and spaced from said hub and defining a gap therebetween having a first side portion opposite a second side portion with a central portion therebetween, said ring having an inner annular surface;
   a rubber insert compression fitted between said outer peripheral surface and said inner annular surface;
   said outer peripheral surface having a concave cross-section, said surface forming a first arc having a first arc radius;
   said inner annular surface having a convex cross section and forming a second arc having a second arc radius, wherein said first arc radius is larger than said second arc radius and is measured from a different centerpoint, thereby configuring said gap to have a wider radial thickness at both said first side portion and said second side portion compared to said central portion.

2. The torsional vibration damper of claim 1, wherein said rubber insert has a non-compressed thickness of 120% to 150% of said radial distance between said outer peripheral surface and said inner annular surface at a center of said torsional vibration damper.

3. The torsional vibration damper of claim 1, wherein said rubber insert has a uniform cross-section before being compression fit between said hub and said ring and thereby is under greater compression in said central portion of said gap compared to said compression at both said first side portion and said second side portion.

4. A torsional vibration damper comprising
   a hub adapted to attach to a rotating component, said hub having an outer peripheral surface;
   a ring surrounding and spaced from said hub and defining a gap therebetween having a first side portion opposite a second side portion with a central portion therebetween, said ring having an inner annular surface;
   a rubber insert compression fitted between said outer peripheral surface and said inner annular surface;
   said outer peripheral surface having a convex cross-section, said surface forming a first arc having a first arc radius;
   said inner annular surface having a concave cross section and forming a second arc having a second arc radius, wherein said first arc radius is smaller than said second arc radius and is measured from a different centerpoint, thereby configuring said gap to have a wider radial thickness at both said first side portion and said second side portion compared to said central portion.

5. The torsional vibration damper of claim 4, wherein said rubber insert has a non-compressed thickness of 120% to 150% of said radial distance between said outer peripheral surface and said inner annular surface at a center of said torsional vibration damper.

6. The torsional vibration damper of claim 4, wherein said rubber insert has a uniform cross-section before being compression fit between said hub and said ring and thereby is under greater compression in said central portion of said gap compared to said compression at both said first side portion and said second side portion.

7. A torsional vibration damper comprising
   a hub adapted to attach to a rotating component and having an outer peripheral surface;
   a ring disposed concentrically about said hub with an inner annular surface thereof facing said outer peripheral surface of said hub and spaced from said hub to define an arcuate gap having a first side portion opposite a second side portion with a central portion therebetween, said first side portion and said second side portion both having a wider radial thickness compared to said central portion;
   an elastomeric member compression fitted in said arcuate gap defined between said outer peripheral surface and said inner annular surface;
   wherein said arcuate gap has a concave face, when viewed in cross-section, defined by said outer peripheral surface of said hub or defined by said inner annular surface of said ring;
   wherein the outer peripheral surface of the hub and the inner peripheral surface of the ring each are arcuate in cross-section, have a radius of curvature, the radius of curvature of one is larger than the radius of curvature of the other, and define an arc of different circles having different centerpoints.

8. The torsional vibration damper of claim 7, wherein said elastomeric member comprises a rubber material.

* * * * *